(12) United States Patent
Kang et al.

(10) Patent No.: US 9,158,157 B2
(45) Date of Patent: Oct. 13, 2015

(54) LIQUID CRYSTAL DISPLAY

(75) Inventors: Chihtsung Kang, Shenzhen (CN); Bo Hai, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 13/704,630

(22) PCT Filed: Sep. 6, 2012

(86) PCT No.: PCT/CN2012/081059
§ 371 (c)(1),
(2), (4) Date: Dec. 17, 2012

(87) PCT Pub. No.: WO2014/032323
PCT Pub. Date: Mar. 6, 2014

(65) Prior Publication Data
US 2015/0177550 A1    Jun. 25, 2015

(30) Foreign Application Priority Data
Sep. 3, 2012 (CN) .......................... 2012 1 0321347

(51) Int. Cl.
*G02F 1/13363* (2006.01)
*G02F 1/1337* (2006.01)
*G02F 1/1335* (2006.01)

(52) U.S. Cl.
CPC .......... *G02F 1/13363* (2013.01); *G02F 1/1336* (2013.01); *G02F 1/1337* (2013.01); *G02F 1/133634* (2013.01); *G02F 2001/133637* (2013.01); *G02F 2001/133746* (2013.01); *G02F 2413/12* (2013.01)

(58) Field of Classification Search
CPC .......... G02F 1/133634; G02F 2413/12; G02F 1/13363; G02F 1/1336; G02F 1/1337; G02F 2001/133746
USPC ..................... 349/96, 119, 177, 181
See application file for complete search history.

(56) References Cited

U.S. PATENT DOCUMENTS

| | | | | |
|---|---|---|---|---|
| 2005/0099563 A1* | 5/2005 | Hsu et al. | ....................... | 349/119 |
| 2010/0026946 A1* | 2/2010 | Iwamoto | ....................... | 349/119 |
| 2010/0053522 A1* | 3/2010 | Iwamoto | ....................... | 349/119 |

* cited by examiner

*Primary Examiner* — Dung Nguyen
*Assistant Examiner* — Tai Duong
(74) *Attorney, Agent, or Firm* — Mark M. Friedman

(57) ABSTRACT

An LCD includes a TAC film, a PVA film, a biaxial compensation film, an LC cell, a second TAC film, a second PVA film, and a third TAC film from the incident surface to the emitting surface. The biaxial compensation film is used for providing a first retardation value and a second retardation value by adjusting thickness and by adjusting a first refractive index, a second refractive index, and a third refractive index. The second TAC film is used for providing a third retardation value by adjusting thickness and by adjusting a fourth refractive index, a fifth refractive index, and a sixth refractive index corresponding to the light in the first direction, the light in the second direction, and the light in the third direction, respectively. Leakage of light is controlled according to the first retardation value, the second retardation value, and the third retardation value in the LCD.

8 Claims, 6 Drawing Sheets

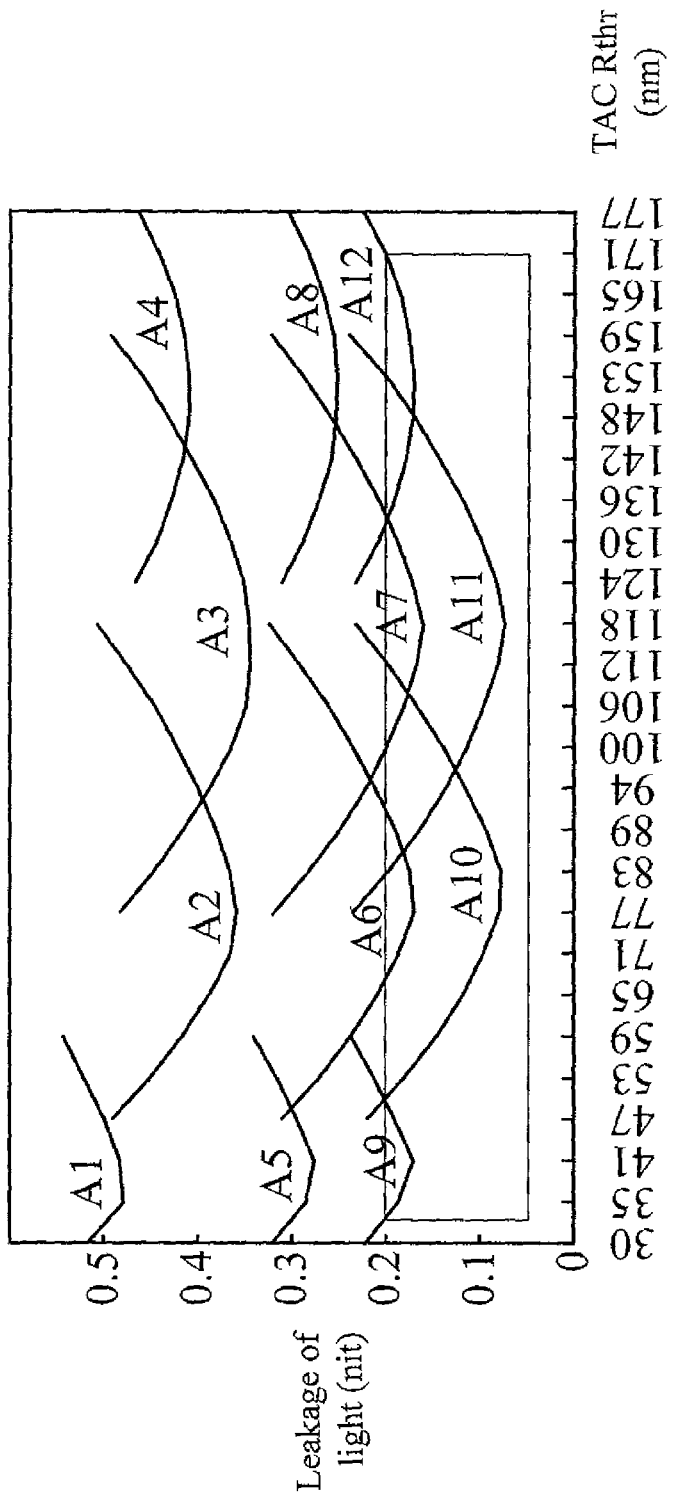

Fig. 2

A1 Pre-tilt angle=85° $Ro_b/Rth_b$=84/280   A7 Pre-tilt angle=87° $Ro_b/Rth_b$=60/200
A2 Pre-tilt angle=85° $Ro_b/Rth_b$=72/240   A8 Pre-tilt angle=87° $Ro_b/Rth_b$=48/160
A3 Pre-tilt angle=85° $Ro_b/Rth_b$=60/200   A9 Pre-tilt angle=89° $Ro_b/Rth_b$=84/280
A4 Pre-tilt angle=85° $Ro_b/Rth_b$=48/160   A10 Pre-tilt angle=89° $Ro_b/Rth_b$=72/240
A5 Pre-tilt angle=87° $Ro_b/Rth_b$=84/280   A11 Pre-tilt angle=89° $Ro_b/Rth_b$=60/200
A6 Pre-tilt angle=87° $Ro_b/Rth_b$=72/240   A12 Pre-tilt angle=89° $Ro_b/Rth_b$=48/160

LIQUID CRYSTAL DISPLAY

BACKGROUND OF THE INVENTION

1. Field of the Invention

The present invention relates to a liquid crystal display (LCD), and more particularly to an LCD comprising a biaxial compensation film.

2. Description of the Prior Art

Owing to their low-profile, thin, and lightweight features, LCDs have become the mainstream display devices in recent years. Liquid crystal screens are widely used in electronic devices such as cellphones, personal digital assistants (PDAs), digital cameras, computers, notebooks, etc.

An LCD comprises an LC cell. An alignment of LC molecules in the LC cell is determined by variation of an electric field applied on the LC cell, and the transmission of light in the LC cell is adjusted accordingly. An LC material has a property of birefringence, which means that the refractive index of light in the direction of the long axis of the molecules is different from the refractive index of light in the direction of the short axis of the molecules. Therefore, linearly polarized incident light has diverse phases through different paths in the LC cell in the polarized direction. The feature of color and the transmission of light at a slant viewing angle are different from those at a front viewing angle.

Birefringence index of the LC molecules in the LC cell varies with an observation inclination. With the observation inclination increases, both of the contrast ratio of an image and image resolution decrease. To enhance the contrast ratio of the image obviously at a specific viewing angle and to reduce leakage of light in dark state on the LCD, a compensator film is attached to the LC panel of a conventional LCD. The birefringence of the LC molecules can be symmetrically compensated because the retardation value of light in different directions is compensated using the compensator film.

A bi-layered compensator film has advantages of reducing leakage of light in dark state on the LCD effectively and enhancing the contrast ratio and resolution at a wide viewing angle. However, the bi-layered compensator film is expensive, so production cost cannot be reduced. Contrarily, production cost can be effectively reduced using a unilayered compensator film while an increase in leakage of light in dark state of the LCD seems inevitable.

SUMMARY OF THE INVENTION

An object of the present invention is to provide an LCD comprising a unilayered compensator film. A retardation value of a triacetate cellulose film (TAC) film can be adjusted by adjusting thickness of the TAC film or the refractive index of the TAC film. In addition, leakage of light in dark state of the LCD where the unilayered compensator film is used can be prevented.

According to the present invention, a liquid crystal display (LCD), comprising a backlight source for generating light; a first triacetate cellulose (TAC) film; a first polyvinyl alcohol (PVA) film; a first phase compensator film, for providing a first retardation value and a second retardation value by adjusting thickness of the first phase compensator film and by adjusting a first refractive index, a second refractive index, and a third refractive index corresponding to the light in a first direction, the light in a second direction, and the light in a third direction, respectively; a liquid crystal (LC) cell; a second phase compensator film, for providing a third retardation value by adjusting thickness of the second phase compensator film and by adjusting a fourth refractive index, a fifth refractive index, and a sixth refractive index corresponding to the light in the first direction, the light in the second direction, and the light in the third direction, respectively; a second PVA film; and a third TAC film. The black-state light leakage at a wide viewing angle is controlled according to the first retardation value, the second retardation value, and the third retardation value in the LCD.

In one aspect of the present invention, a phase delay of the LC cell determined by (ne−no)×d is between 342.8 nm and 361.4 nm, where ne indicates an extraordinary refractive index, no indicates an ordinary refractive index, and d indicates thickness of the LC cell.

In another aspect of the present invention, the first retardation value is determined by the first refractive index, the second refractive index, and thickness of the first phase compensator film.

In another aspect of the present invention, the first retardation value of the first phase compensator film is between 45.6 nm and 85.8 nm.

In another aspect of the present invention, the second retardation value is determined by the first refractive index, the second refractive index, the third refractive index, and thickness of the first phase compensator film.

In another aspect of the present invention, the second retardation value is between 152 nm and 286 nm.

In another aspect of the present invention, a pretilt angle of LC molecules in the LC cell is between 85 and 90 angles while 90 degrees are excluded.

In another aspect of the present invention, the third retardation value is determined by the fourth refractive index, the fifth refractive index, the sixth refractive index, and thickness of the second phase compensator film.

In another aspect of the present invention, the third retardation value is between $Y_1$ nm and $Y_2$ nm where $Y_1=0.0052854x^2-3.15264x+502.64$ and $Y_2=-0.0064882x^2+1.85x+57.78$ stand, and x indicates the second retardation value.

In another aspect of the present invention, the first phase compensator film is a biaxial compensation film, and the second phase compensator film is a second TAC film.

In another aspect of the present invention, the LCD further comprises a third phase compensator film, the first phase compensator film is attached to the second phase compensator film, the first phase compensator film is a biaxial compensation film, the second phase compensator film is a second TAC film, and the third phase compensator film is a fourth TAC film.

In another aspect of the present invention, the third phase compensator film is used for providing a fourth retardation value by adjusting thickness of the third phase compensator film and by adjusting a seventh refractive index, an eighth refractive index, and a ninth refractive index corresponding to the light in the first direction, the light in the second direction, and the light in the third direction, respectively, where leakage of light is controlled according to the first retardation value, the second retardation value, the third retardation value, and the fourth retardation value in the LCD.

Contrast to the conventional technology, the LCD where a single biaxial compensation film is used is provided in the present invention. When a phase delay of the LC cell is between 342.8 nm and 361.4 nm (the phase delay corresponding to a wavelength of 550 nm) and a pretilt angle of LC molecules in the LC cell is between 85 and 90 angles (but 90 degrees are excluded), a first retardation value $Ro_b$ of a first phase compensator film is controlled between 45.6 nm and 85.8 nm, a second retardation value $Rth_b$ of the first phase compensator film is controlled between 152 nm and 286 nm, and a third retardation value of a second phase compensator film is controlled between $Y_1$ nm and $Y_2$ nm where $Y_1=0.0052854x^2-3.15264x+502.64$ and $Y_2=-0.0064882x^2+1.85x+57.78$ stand, and x indicates the second retardation value. The maximum black-state light leakage on the LCD in the present invention is smaller than the maximum black-state light leakage on the conventional LCD where the single biaxial compensation film is used. Moreover, the contrast ratio and resolution of a wide viewing angle (not a horizontal or vertical azimuth) of the LCD in the present invention are effectively enhanced.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 and FIG. 3 showing diagrams of the relation of the third retardation value $Rth_T$ of the second TAC film and the value of leakage of light when the LC molecules are at difference pretilt angles and the first retardation value $Ro_b$ and the second retardation value $Rth_b$ of difference biaxial compensation films provided that the phase delay of the LC cell is 342.8 nm and 361.4 nm.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
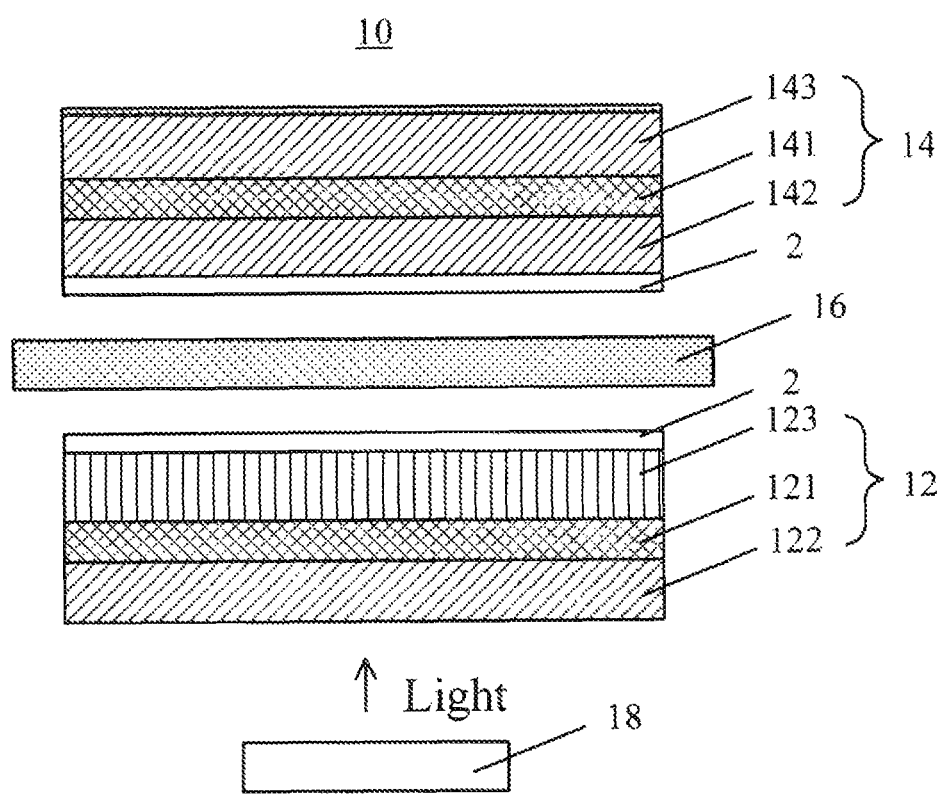
FIG. 1 shows a schematic diagram of an LCD according to a first embodiment of the present invention.

FIG. 1 shows a schematic diagram of an LCD 10 according to a first embodiment of the present invention. The LCD 10 comprises an LC cell 16, a first polarizer 12, a second polarizer 14, and a backlight source 18. The backlight source 18 is used for generating light. The LC cell 16 is glued to the first polarizer 12 and to the second polarizer 14 which faces the first polarizer 12 with a pressure sensitive adhesive (PSA) 2. The first polarizer 12 and the second polarizer 14 are used for deflecting incident light. A first optical axis of the first polarizer 12 is perpendicular to a second optical axis of the second polarizer 14.

The first polarizer 12 comprises a first polyvinyl alcohol (PVA) film 121, a first triacetate cellulose (TAC) film 122, and a first phase compensator film 123. The PVA film 121 is inserted between the first TAC film 122 and the first phase compensator film 123. The second polarizer 14 comprises a second PVA film 141, a second phase compensator film 142, and a third TAC film 143. The second PVA film 141 is inserted between the second phase compensator film 142 and the third TAC film 143. In this embodiment, the first phase compensator film 123 is a biaxial compensation film. The second phase compensator film 142 is a second TAC film. The first phase compensator film 123 is used for providing a first retardation value and a second retardation value. The second phase compensator film 142 is used for providing a third retardation value. The slow axis of the first phase compensator film 123 forms a 90 degree angle with the absorption axis of the first PVA film 121. The slow axis of the second phase compensator film 142 forms a 90 degree angle with the absorption axis of the second PVA film 141. The method of determination of the first retardation value, the second retardation value, and the third retardation value will be detailed in the following description. The phase delay of the LC cell 16, the retardation value of the TAC film, and the retardation value of the biaxial compensation film all are values corresponding to a wavelength of 550 nm in the following embodiments.

Figure 3:
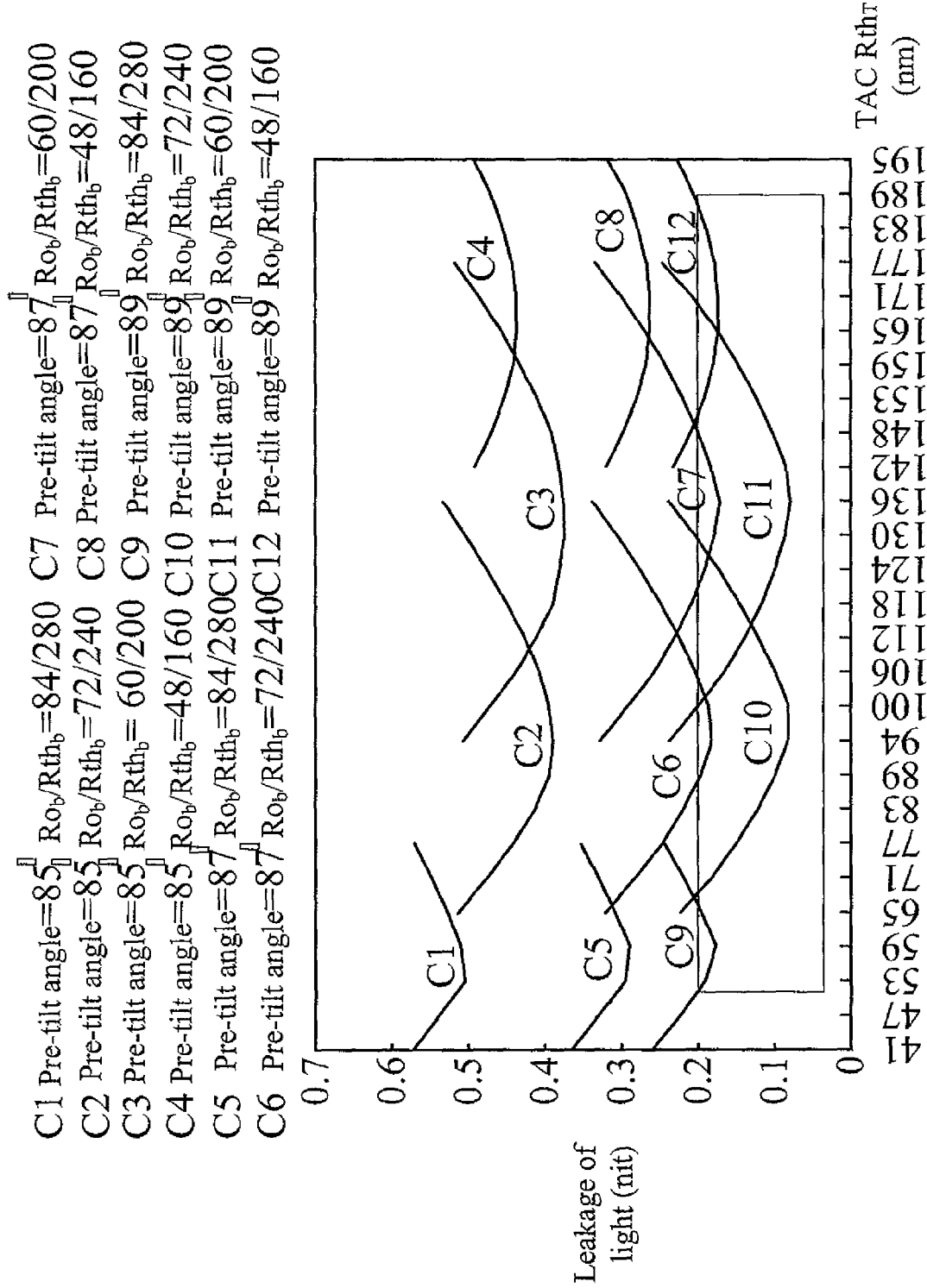

Refer to FIG. 2 and FIG. 3 showing diagrams of the relation of the third retardation value $Rth_T$ of the second TAC film and the value of leakage of light when the LC molecules are at difference pretilt angles and the first retardation value $Ro_b$ and the second retardation value $Rth_b$ of difference biaxial compensation films provided that the phase delay of the LC cell 16 is 342.8 nm and 361.4 nm (the phase delay corresponding to a wavelength of 550 nm). In the present invention, the incident light generated by the backlight source 18 belongs to Lambertian distribution. Luminance in the center of the incident light is defined as 100 nit. The pretilt angle of the LC molecules in the LC cell 16 is between 85 and 90 angles (but 90 degrees are excluded). The phase delay of the LC cell 16 is determined by (ne−no)×d. The phase delay of the LC cell 16 is between 342.8 nm and 361.4 nm where ne indicates an extraordinary refractive index of the LC cell 16, no indicates an ordinary refractive index of the LC cell 16, and d indicates thickness of the LC cell 16.

In FIG. 2 and FIG. 3, $Ro_b$ indicates the first retardation value of the first phase compensator film 123 in the X-Y plane. $Rth_b$ indicates the second retardation value of the first phase compensator film 123 in the axial (Z) direction. $Rth_T$ indicates the third retardation value of the second phase compensator film 142 in the axial (Z) direction. $Ro_b$, $Rth_b$, and $Rth_T$ are determined by values plugged into the following equations:

$$Ro_b=(Nx_b-Ny_b)\times D_b;$$

$$Rth_b=[(Nx_b+Ny_b)/2-Nz_b]\times D_b;$$

$$Rth_T=[(Nx_T+Ny_T)/2-Nz_T]\times D_T;$$

where $Nx_b$, $Ny_b$, and $Nz_b$ indicate refractive indexes of the light generated by the backlight source 18 corresponding to the X-, Y- and Z-axes of three-dimensional Cartesian coordinates, respectively, when the light passes through the first phase compensator film 123. $Nx_T$, $Ny_T$, and $Nz_T$ indicate refractive indexes of the light generated by the backlight source 18 corresponding to the X-, Y-, and Z-axes of three-dimensional Cartesian coordinates, respectively, when the light passes through the second phase compensator film 142. $D_b$ and $D_T$ indicate thickness of the first phase compensator film 123 and thickness of the second phase compensator film 142, respectively.

Line segments A1 and A2 as shown in FIG. 2, when the phase delay of the LC cell 16 is 342.8 nm and the pretilt angle of the LC molecules is 85 degrees, the value of leakage of light of the LCD 10 is smaller than ($Ro_b$, $Rth_b$)=(72 nm, 240 nm), provided that $(Ro_b, Rth_b)=(72$ nm, 240 nm) stands where $Ro_b$ indicates the first retardation value of the first phase compensator film 123, and $Rth_b$ indicates the second retardation value of the first phase compensator film 123. Line segments A3 and A4 as shown in FIG. 2, when the phase delay of the LC cell 16 is 342.8 nm and the pretilt angle of the LC molecules is 85 degrees, the value of leakage of light of the LCD 10 is smaller than $(Ro_b, Rth_b)=(48$ nm, 160 nm), provided that $(Ro_b, Rth_b)=(60$ nm, 200 nm) stands.

Line segments A5, A6, A9, and A10 as shown in FIG. 2, when the phase delay of the LC cell 16 is 342.8 nm and the pretilt angle of the LC molecules is 87 and 89 degrees, the value of leakage of light of the LCD 10 is smaller than $(Ro_b, Rth_b)=(84$ nm, 280 nm), provided that $(Ro_b, Rth_b)=(72$ nm, 240 nm) stands. Line segments A7, A8, A11, and A12 as shown in FIG. 2, when the phase delay of the LC cell 16 is 342.8 nm and the pretilt angle of the LC molecules is 87 and 89 degrees, the value of leakage of light of the LCD 10 is smaller than $(Ro_b, Rth_b)=(48$ nm, 160 nm), provided that $(Ro_b, Rth_b)=(60$ nm, 200 nm) stands. Preferably, the value of leakage of light of the LCD 10 will be smaller when the third retardation value $Rth_T$ between 106.2 nm and 129.8 nm is taken into considerations.

Line segments C1, C2, C5, C6, C9, and C10 as shown in FIG. 3, when the phase delay of the LC cell 16 is 361.4 nm and the pretilt angle of the LC molecules is 85, 87 and 89 degrees, the value of leakage of light of the LCD 10 is smaller than $(Ro_b, Rth_b)=(84$ nm, 280 nm), provided that $(Ro_b, Rth_b)=(72$ nm, 240 nm) stands. Line segments C3, C4, C7, C8, C11, and C12 as shown in FIG. 3, when the phase delay of the LC cell 16 is 361.4 nm and the pretilt angle of the LC molecules is 85, 87 and 89 degrees, the value of leakage of light of the LCD 10 is smaller than $(Ro_b, Rth_b)=(48$ nm, 160 nm), provided that $(Ro_b, Rth_b)=(60$ nm, 200 nm) stands.

Even though the first retardation value $Ro_b$ is between 48 nm and 84 nm and the second retardation value $Rth_b$ is between 160 nm and 280 nm as shown in FIG. 2 and FIG. 3, the first retardation value $Ro_b$ and the second retardation value $Rth_b$ can be slightly adjusted. In other words, the first retardation value $Ro_b$ is between 45.6 nm and 85.8 nm, and the second retardation value $Rth_b$ is between 152 nm and 286 nm if the minimal amount of light that leaks through the display in the dark state is 0.2 nit. To ensure that the minimal amount of light that leaks through the display in the dark state is less than 0.2 nit when the first retardation value $Ro_b$ is between 45.6 nm and 85.8 nm, and the second retardation value $Rth_b$ is between 152 nm and 286 nm, the third retardation value $Rth_T$ is between the $Y_1$ nm and $Y_2$ nm where $Y_1=0.0052854x^2-3.15264x+502.64$ and $Y_2=-0.0064882x^2+1.85x+57.78$ stand, and x indicates the second retardation value $Rth_b$.

Provided that the phase delay of the LC cell is 352.1 nm, the first retardation value Ro of the biaxial compensation film is 72 nm, the second retardation value Rth of the biaxial compensation film is 240 nm, and the third retardation value Rth of the second TAC film is 240 nm in the conventional LCD where the single biaxial compensation film is used, leakage of light in dark state occurs at $\phi=20°-40°$, $\phi=140°-160°$, $\phi=200°-220°$, and $\phi=310°-330°$ where $\phi$ indicates an angle formed by the X axis and a projection of the axis of the LC molecules in the X-Y plane. However, an experiment proves that light leakage can still be prevented in the LCD 10 where the single first phase compensator film 123 according to the first retardation value $Ro_b$, the second retardation value $Rth_b$, and the third retardation value $Rth_T$ when the phase delay of the LC cell 16 is between 342.8 nm and 361.4 nm and the pretilt angle of the LC molecules in the LC cell 16 is between 85 and 90 angles (but 90 degrees are excluded). In other words, the first retardation value $Ro_b$ is controlled between 45.6 nm and 85.8 nm, and the second retardation value $Rth_b$ is controlled between 152 nm and 286 nm. Meanwhile, the third retardation value $Rth_T$ of the second phase compensator film 142 is adjusted according to the adjusted second retardation value $Rth_b$. In this way, the third retardation value $Rth_T$ can be between $Y_1$ nm and $Y_2$ nm where $Y_1=0.0052854x^2-3.15264x+502.64$ and $Y_2=-0.0064882x^2+1.85x+57.78$ stand, and x indicates the second retardation value $Rth_b$. The value of black-state light leakage on the LCD 10 is smaller than the value of black-state light leakage on the conventional LCD where the single biaxial compensation film is used.

The first phase compensator film 123 and the second phase compensator film 142 are not limited to the positions as shown in FIG. 1. Other embodiments which have the same effects are elaborated in the following.

Figure 4:
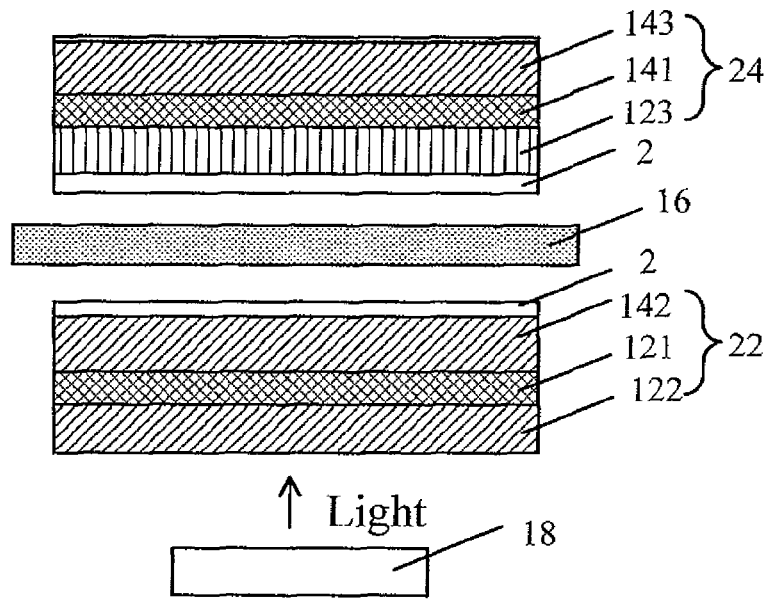
FIG. 4 showing a schematic diagram of an LCD according to a second embodiment of the present invention.

Refer to FIG. 4 showing a schematic diagram of an LCD 20 according to a second embodiment of the present invention. The difference between FIG. 4 and FIG. 1 is that, in FIG. 4, a first polarizer film 22 in the LCD 20 comprises a first TAC film 122, a first PVA film 121, and a second phase compensator film 142 from the incident surface to the emitting surface. A second polarizer film 24 in the LCD 20 comprises a first phase compensator film 123, a second PVA film 141, and a third TAC film 143 from the incident surface to the emitting surface. The second phase compensator film 142 is a second TAC film. The first phase compensator film 123 is a biaxial compensation film.

Figure 5:
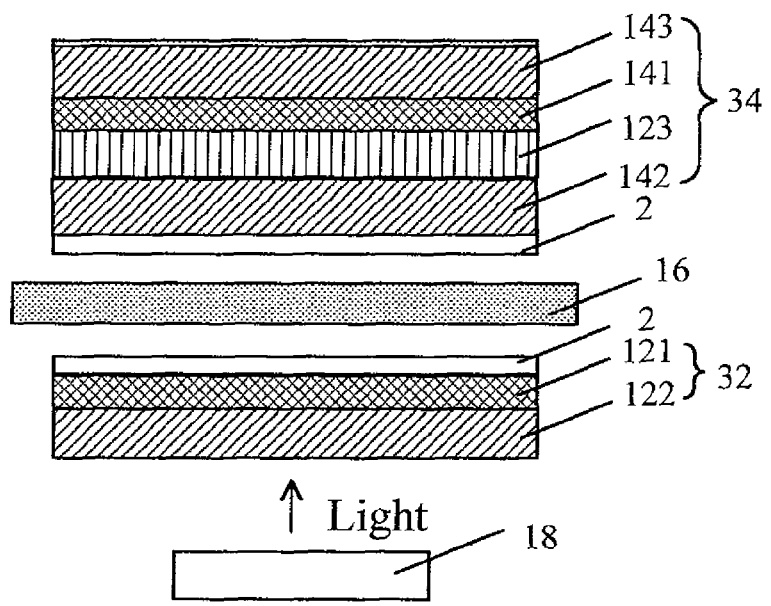
FIG. 5 showing a schematic diagram of an LCD 20 according to a third embodiment of the present invention.

Refer to FIG. 5 showing a schematic diagram of an LCD 30 according to a third embodiment of the present invention. The difference between FIG. 5 and FIG. 1 is that, in FIG. 5, a first polarizer film 32 in the LCD 30 comprises a first TAC film 122 and a first PVA film 121 from the incident surface to the emitting surface. A second polarizer film 34 in the LCD 30 comprises a second phase compensator film 142, a first phase compensator film 123, a second PVA film 141, and a third TAC film 143 from the incident surface to the emitting surface. The first phase compensator film 123 is a biaxial compensation film, and the second phase compensator film 142 is a second TAC film in this embodiment. The slow axis of the first phase compensator film 123 and the slow axis of the second phase compensator film 142 form a 90 degree angle with the absorption axis of the second PVA film 141, respectively.

Figure 6:
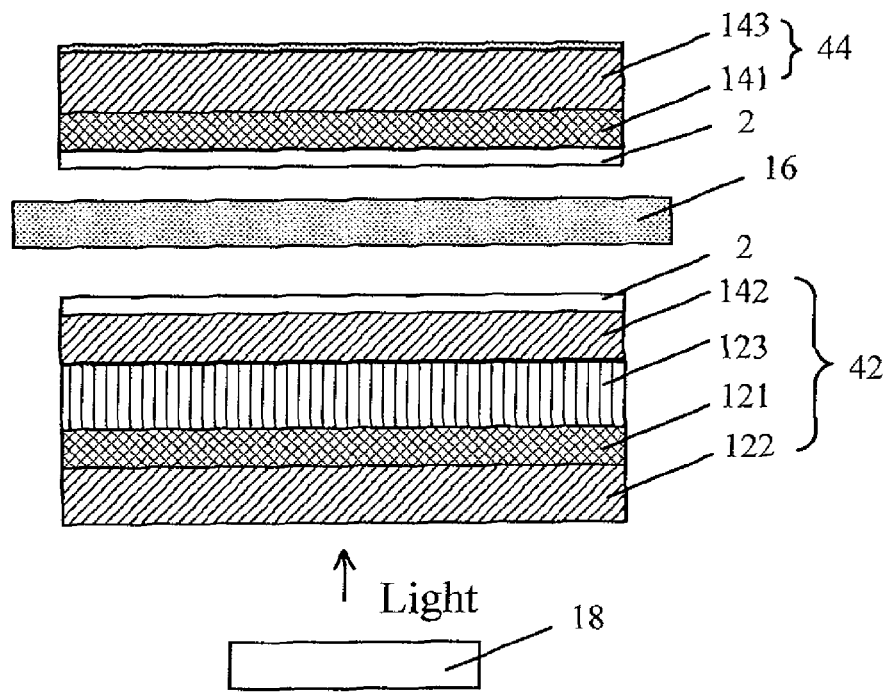
FIG. 6 showing a schematic diagram of an LCD 20 according to a fourth embodiment of the present invention.

Refer to FIG. 6 showing a schematic diagram of an LCD 40 according to a fourth embodiment of the present invention. The difference between FIG. 6 and FIG. 5 is that, in FIG. 6, a first polarizer film 42 in the LCD 40 comprises a first TAC film 122, a first PVA film 121, a first phase compensator film 123, and a second phase compensator film 142 from the incident surface to the emitting surface. A second polarizer film 44 in the LCD 40 comprises a second PVA film 141 and a third TAC film 143 from the incident surface to the emitting surface. The first phase compensator film 123 is a biaxial compensation film, and the second phase compensator film 142 is a second TAC film in this embodiment. The slow axis of the first phase compensator film 123 and the slow axis of the second phase compensator film 142 form a 90 degree angle with the absorption axis of the first PVA film 121, respectively.

Figure 7:
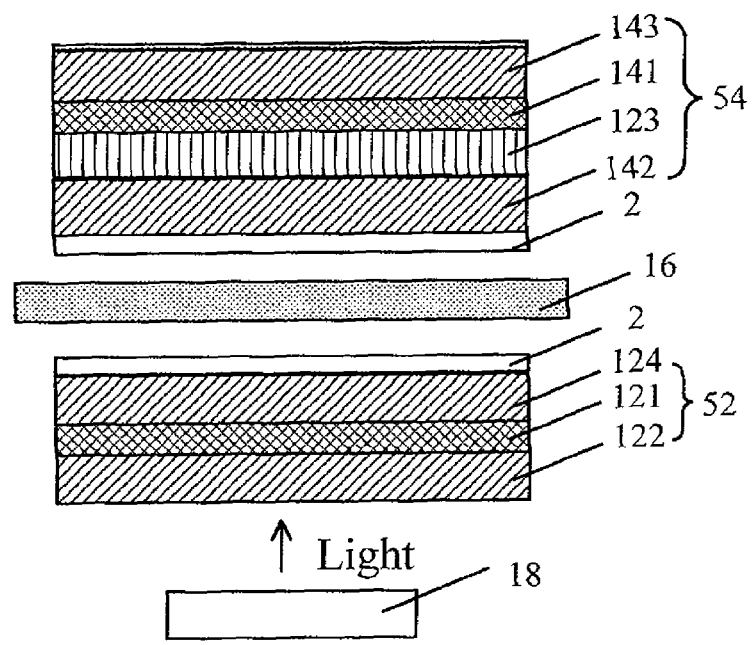
FIG. 7 showing a schematic diagram of an LCD 20 according to a fifth embodiment of the present invention.

Refer to FIG. 7 showing a schematic diagram of an LCD 50 according to a fifth embodiment of the present invention. The difference between FIG. 7 and FIG. 5 is that, in FIG. 7, a first polarizer film 52 in the LCD 50 comprises a first TAC film 122, a first PVA film 121, and a third phase compensator film 124 from the incident surface to the emitting surface. A second polarizer film 54 in the LCD 50 comprises a second phase compensator film 142, a first phase compensator film 123, a second PVA film 141, and a third TAC film 143 from the incident surface to the emitting surface. The first phase compensator film 123 is a biaxial compensation film, the second phase compensator film 142 is a second TAC film, and the third phase compensator film 124 is a fourth TAC film in this embodiment. The slow axis of the first phase compensator film 123 and the slow axis of the second phase compensator film 142 form a 90 degree angle with the absorption axis of the second PVA film 141, respectively. The third phase compensator film 124 provides a fourth retardation value $Rth_{T'}$ by adjusting thickness of the third phase compensator film 124 and by adjusting refractive indexes of the light generated by the backlight source 18 corresponding to the X-, Y-, and Z-axes of three-dimensional Cartesian coordinates. The leakage of light in the LCD 50 is controlled according to the first retardation value $Ro_b$, the second retardation value $Rth_b$, the third retardation value $Rth_T$, and the fourth retardation value $Rth_{T'}$. What is worth noting is that, the sum of the third retardation value $Rth_T$ provided by the second phase compensator film 142 and the fourth retardation value $Rth_{T'}$ provided by the third phase compensator film 124 in the LCD 50 as shown in FIG. 7 is equal to the third retardation value $Rth_T$ provided by the second phase compensator film 142 in the LCD 10 as shown in FIG. 1.

Figure 8:
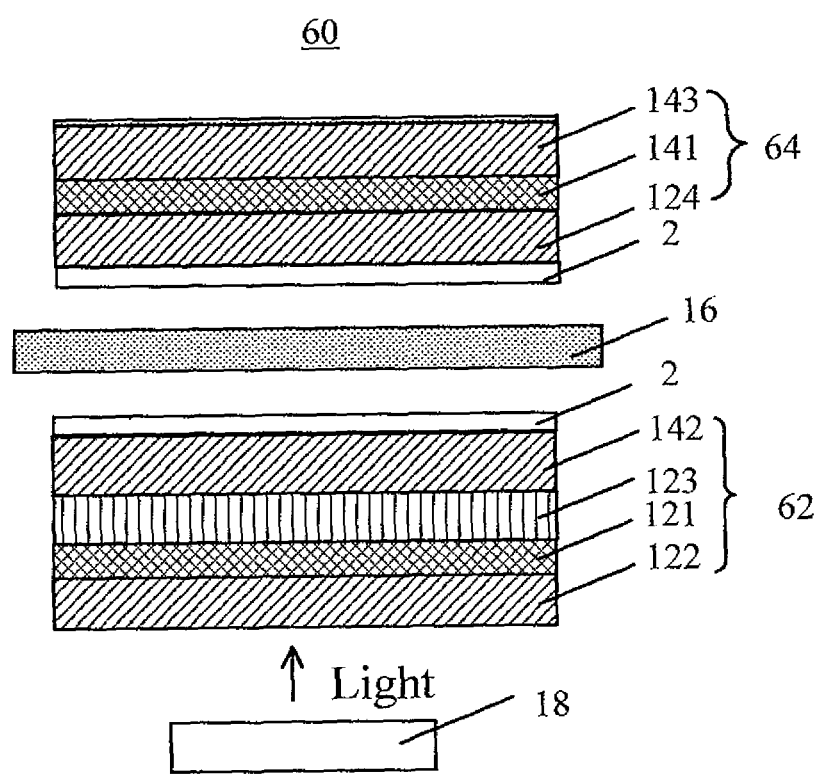
FIG. 8 showing a schematic diagram of an LCD 60 according to a sixth embodiment of the present invention.

Refer to FIG. 8 showing a schematic diagram of an LCD 60 according to a sixth embodiment of the present invention. The difference between FIG. 8 and FIG. 7 is that, in FIG. 8, a first polarizer film 62 in the LCD 60 comprises a first TAC film 122, a first PVA film 121, a first phase compensator film 123, and a second phase compensator film 142 from the incident surface to the emitting surface. A second polarizer film 64 in the LCD 60 comprises a third phase compensator film 124, a second PVA film 141, and a third TAC film 143 from the incident surface to the emitting surface. The first phase compensator film 123 is a biaxial compensation film, the second phase compensator film 142 is a second TAC film, and the third phase compensator film 124 is a fourth TAC film in this embodiment. The slow axis of the first phase compensator film 123 and the slow axis of the second phase compensator film 142 form a 90 degree angle with the absorption axis of the second PVA film 141, respectively. The third phase compensator film 124 provides a fourth retardation value $Rth_{T'}$ by adjusting thickness of the third phase compensator film 124 and by adjusting refractive indexes of the light produced by the backlight source 18 corresponding to the X-, Y-, and Z-axes of three-dimensional Cartesian coordinates. The leakage of light in the LCD 60 is controlled according to the first retardation value $Ro_b$, the second retardation value $Rth_b$, the third retardation value $Rth_T$, and the fourth retardation value $Rth_{T'}$. What is worth noting is that, the sum of the third retardation value $Rth_T$ provided by the second phase compensator film 142 and the fourth retardation value $Rth_{T'}$ provided by the third phase compensator film 124 in the LCD 60 as shown in FIG. 8 is equal to the third retardation value $Rth_T$ provided by the second phase compensator film 142 in the LCD 10 as shown in FIG. 1.

Each of the LCDs 20, 30, 40, 50, and 60 as shown in FIGS. 4 to 8 is similar to the LCD 10 as shown in FIG. 1. Leakage of light in each of the LCDs 20, 30, 40, 50, and 60 can be controlled by adjusting the first retardation value $Ro_b$, the second retardation value $Rth_b$, the third retardation value $Rth_T$, and the fourth retardation value $Rth_{T'}$. The adjustment range of the first retardation value $Ro_b$, of the second retardation value $Rth_b$, of the third retardation value $Rth_T$, and of the fourth retardation value $Rth_{T'}$ for each of the LCDs 20, 30, 40, 50, and 60 is similar to that for the LCD 10, so no further information will be provided.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A liquid crystal display (LCD), comprising a backlight source for generating light, and the LCD also comprising
    a first triacetate cellulose (TAC) film;
    a first polyvinyl alcohol (PVA) film;
    a first phase compensator film, for providing a first retardation value and a second retardation value by adjusting thickness of the first phase compensator film and by adjusting a first refractive index, a second refractive index, and a third refractive index corresponding to the light in a first direction, the light in a second direction, and the light in a third direction, respectively;
    a liquid crystal (LC) cell;
    a second phase compensator film, for providing a third retardation value by adjusting thickness of the second phase compensator film and by adjusting a fourth refractive index, a fifth refractive index, and a sixth refractive index, respectively;
    a second PVA film; and
    a third TAC film;
    wherein black-state light leakage at a wide viewing angle is controlled according to the first retardation value, the second retardation value, and the third retardation value in the LCD,
    wherein the third retardation value is determined by the fourth refractive index, the fifth refractive index, the sixth refractive index, and thickness of the second phase compensator film, and the third retardation value is between $Y_1$ nm and $Y_2$ nm where $Y_1=0.0052854x^2-3.15264x+502.64$ and $Y_2=-0.0064882x^2+1.85x+57.78$ stand, and x indicates the second retardation value.

2. The LCD as claimed in claim 1, wherein a phase delay of the LC cell determined by (ne−no)×d is between 342.8 nm and 361.4 nm, where ne indicates an extraordinary refractive index, no indicates an ordinary refractive index, and d indicates thickness of the LC cell.

3. The LCD as claimed in claim 1, wherein the first retardation value is determined by the first refractive index, the second refractive index, and thickness of the first phase compensator film.

4. The LCD as claimed in claim 2, wherein the first retardation value of the first phase compensator film is between 45.6 nm and 85.8 nm.

5. The LCD as claimed in claim 1, wherein the second retardation value is determined by the first refractive index, the second refractive index, the third refractive index, and thickness of the first phase compensator film.

6. The LCD as claimed in claim 5, wherein the second retardation value is between 152 nm and 286 nm.

7. The LCD as claimed in claim 1, wherein the first phase compensator film is a biaxial compensation film, and the second phase compensator film is a second TAC film.

8. The LCD as claimed in claim 1, wherein the LCD further comprises a third phase compensator film, the first phase compensator film is attached to the second phase compensator film, the first phase compensator film is a biaxial compensation film, the second phase compensator film is a second TAC film, and the third phase compensator film is a fourth TAC film.

* * * * *